3,231,592
OIL-DISPERSIBLE METAL OXIDE-FATTY ACID COMPLEXES AND THEIR MANUFACTURE
Andrew T. McCord, Snyder, N.Y., assignor to The Carborundum Company, Niagara Falls, N.Y., a corporation of Delaware
No Drawing. Filed May 8, 1961, Ser. No. 108,248
14 Claims. (Cl. 260—414)

This invention relates to novel oil-dispersible complexes. More particularly, it relates to novel metal oxide-fatty acid complexes and a method of making the complexes.

The metallic salts of fatty acids are well-known in the art and have been named metal soaps. They are characteristically insoluble in water, but soluble in oil. They have been extensively used for many industrial applications. For example, in the paint, varnish and textile industries, they have been used as driers. The hydrophobic properties of the metal soaps have made them useful for waterproofing leather, explosives and textiles. Metal soaps have been used for thickening organic liquids. They also have been used as emulsifiers and agents for metal surface treatments.

This invention provides a complex of a metal oxide and a fatty acid which is similar to the corresponding metal soap in many respects. One important difference between the complexes of this invention and the metal soaps is that the complexes are not oil-soluble. They are, however, oil dispersible. Nevertheless, the complexes of this invention may be used for many of the same applications as the metal soaps. They are effective as waterproofing compounds and as thickeners for paint formulations. They can be utilized as protective films for metal surfaces. Furthermore, the complexes can be manufactured more readily than the corresponding metal soaps.

One particular application in which many of the complexes of this invention have proved valuable is as an additive to residual fuel oils containing vanadium, sodium and sulfur contaminants. When fuel oil containing these contaminants and the complexes of this invention is burned, the vanadium oxides formed react with the complex to form vanadates. While the oxides are molten at the temperatures encountered in a power plant and corrode the parts thereof, the vanadates have a higher melting point and are carried from the power plant as a solid ash. Fuel oils containing the complex of this invention are fully described in an application filed concurrently herewith entitled, "Fuel Oil Composition," and bearing Serial Number 108,247.

Briefly stated, the complex of this invention comprises a metal oxide and a fatty acid linked through a basic cation. The complexes are made by preparing a hydrated metal oxide and reacting the oxide with a fatty acid. The nature of the novel complexes and the method of making them will be apparent from consideration of the following complete description taken in conjunction with the specific examples.

THE COMPLEXES

The complexes of this invention can be represented by the formula, $ACOOY \cdot x(MO)$, wherein: MO is a metal oxide, M being a metal selected from the group consisting of titanium, zirconium, hafnium, thorium, germanium, tin, niobium, tantalum, molybdenum, tungsten, uranium, cerium, the rare earths, copper, beryllium, zinc, cadmium, mercury, aluminum, yttrium, gallium, indium, lanthanum, manganese, iron, cobalt, nickel, calcium, magnesium, strontium and barium; ACOO represents the anion of a fatty acid; Y represents a basic cation selected from the group consisting of sodium, potassium, ammonium, lithium, rubidium, cesium, calcium, magnesium, strontium, and barium; and $x$ is a number greater than one.

The term "fatty acid" has been variously defined. It is utilized herein in its broadest sense and includes not only the saturated acids, both normal and branch chain, but also includes unsaturated acids, certain substituted acids, such as those having hydroxy- and keto-acid substituents, aliphatic acids containing alicyclic substituents, such as the chaulmoogra-oil acids, and certain alicyclic acids, such as the naphthenic acids, which contain no aliphatic chain. The acid will have six or more carbon atoms.

The complexes can be solid, paste or liquid, depending upon the oxide and acid in the complexes. They are strongly hydrophobic and are insoluble in oil. However, they are directly dispersible in oils. The dispersions exhibit all the properties ascribed to dispersions, for example, the Tyndall effect and an unchanged boiling point of the dispersant. Furthermore, the dispersions are so stabilized that they are not flocculated by the addition of electrolytes.

A solubility test was performed to establish the difference between the complexes of this invention and conventional oil-soluble metal soaps. The novel complexes of this invention when admixed in a hydrocarbon oil, such as kerosene, produced an opaque dispersion. The prior art metal soaps, when mixed in the same hydrocarbon oil, resulted in a crystal clear solution.

To show that some bonding occurs between the metal oxide and the fatty acid and that a complex in fact exists rather than a mere mixture of a hydrous oxide and a metal soap, a hydrous oxide mixed with a small amount of soap as a wetting agent was added to oil. Even with vigorous agitation, no dispersion was formed, the oxide settling out. The complex of this invention, on the other hand, formed an opaque dispersion in the oil.

THE NOVEL PROCESS

The novel process of this invention whereby complexes described above can be prepared comprises a two-step operation. The first step consists of forming a hydrated metal oxide. Metal oxides which are acidic, amphoteric or only slightly basic are only slightly soluble in water. The hydrous oxide of these metals is formed by precipitation with a base. The oxides of calcium, barium, strontium and magnesium are quite basic and appreciably water soluble. They are easily hydrated and, thus, slurries of the hydroxides of these metals are used.

These hydrates are then reacted with a fatty acid to form the novel complex of this invention. As the fatty acid is added to and mixed with the thick or gel-like hydrate, it becomes progressively thinner until an unexpected separation into two phases occurs, an aqueous phase and a product phase. All the metal oxide and fatty acid are in the product phase.

It is a well-known fact that hydrous oxides adsorb ions of the base with which they are precipitated. These ions cannot be removed by prolonged washing. For example, the neutralization of titanium sulphate with ammonium hydroxide to 8 pH results in a gelatinous hydrous oxide precipitate containing adsorbed ammonia which cannot be removed by water washing. While the exact mechanism of the reaction is not fully understood, it is believed that this adsorbed alkali which is permanently attached to the oxide reacts with the fatty acid to produce oil wetting of the hydrous oxide floc. In this manner the alkali links the oxide to the fatty acid and the complex thus formed is oil wetted and hydrophobic. In the case of the strongly basic oxides, calcium, barium, strontium and magnesium, the oxides situated on the surface of the flocs react with the fatty acid to produce an oil wetted and hydrophobic floc. Thus in this case the oxide functions both as the oxide of the complex and the basic cation link.

During the process the water of hydration is apparently forced from the floc. Any water left in the product appears to be entrapped water since the water decreases to the vanishing point when the product is treated by various means such as filtering, centrifuging and kneading.

The quantity of fatty acid necessary to produce the novel complex varied depending upon the metallic oxide and the amount of adsorbed alkali present. In all cases, less acid than would be theoretically required to form a metal soap was used to produce this novel complex. In general, the acid added varied from one percent to twenty-five percent one-hundredth to one-quarter of that required to form a true metal soap.

In the case of the acid oxides, repeated tests showed that only sufficient acid to neutralize the adsorbed alkali was required to produce the phase separation. When the hydrous oxide contained a small amount of adsorbed alkali, the novel product was very stiff and solid. When the adsorbed alkali was present in larger amounts, the novel product was more pasty. If the acid was diluted with an organic solvent, such as fuel oil, kerosene or a hydrocarbon, or if a considerable excess of acid was used, the novel product was usually a liquid.

When basic or amphoteric oxides are utilized, it is imperative that excessive fatty acid not be added. After the original phase separation the oil phase will continue to absorb fatty acid and, if the amount of acid added reaches the amount required by stoichiometric proportions for a metal soap, a typical oil soluble metal soap will be formed. This phenomenon is the subject matter of an application filed concurrently herewith entitled, "Method of Manufacturing Metal Soaps," and bearing Serial Number 108,249, now abandoned.

Combinations of the novel complexes of this invention and combinations of the novel complex with a typical metal soap may be made utilizing the novel process of this invention. In some instances, this may be advantageous since if an acid hydrous oxide can be co-precipitated with a basic hydrous oxide, the basic oxide readily reacts with an acid and assists the reaction between the acid oxide and the fatty acid. The intimately mixed hydrate will more easily react with the acid than the acidic oxide alone. The product phase may contain some oil soluble soap of the basic hydrate, but will also contain substantial quantities of the novel complex of both the basic and acidic oxide. Such combinations are within the scope of this invention.

EXAMPLES

The following specific examples will illustrate and highlight the production of the novel complexes of this invention.

*Example I*

One liter of zirconium sulphate solution containing the equivalent of 100 grams of zirconium dioxide and 200 grams of sulphuric acid was neutralized with aqueous ammonia to 8 pH. A dense gelatinous precipitate of hydrous zirconium oxide was formed in a solution of ammonium sulphate. This precipitate was treated in three ways:

A. One third of the precipitate was washed to remove ammonium sulfate. Sixty-six grams of tall oil free fatty acid was slowly mixed into the washed hydrous oxide. Two phases resulted, an aqueous phase and an oil phase. The oil phase was a thick semi-solid particulate material. Adhering water was removed by filtration and the "butter" so produced analyzed 30% $ZrO_2$; 60% oil and 10% residual water. On centrifuging, further water was squeezed out of the product which then analyzed 32% $ZrO_2$; 64% oil; 4% water.

B. Sixty-six grams of tall oil heads, a composition containing 65% free fatty acid and 35% unsaponifiable oils, was added directly to one-third of the precipitated oxide. Upon continued agitation, a fine oil-phase precipitate resulted having small grains about ⅛" to ¼" in diameter. The batch was vacuum filtered, and washed until the filtrate tested free of sulfate ion. The product analyzed 22% $ZrO_2$; 44% oils and 34% water. When dispersed in No. 2 fuel oil an emulsion resulted. After two hours, the water had separated and the oil dispersion analyzed 18% $ZrO_2$ and less than 1% water.

C. A solution of 16.5 grams of oleic acid in 49.5 grams of No. 2 fuel oil was slowly stirred into one-third of the washed hydrate. When all the oil had been added, the batch separated into two phases, an aqueous phase and a pasty organic phase. Upon the addition of 16.5 grams of No. 2 fuel oil, the oil phase thinned to a liquid and was easily drawn off. It contained all the zirconium dioxide in colloidal dispersion.

*Example II*

An oil dispersible titanium oxide-fatty acid complex was made by precipitating with ammonia a solution of 100 grams of titanium sulfate dissolved in 400 ml. of water. The washed hydrous oxide precipitate contained 30 grams of titanium dioxide and 192 grams of water. Forty grams of tall oil free fatty acids were stirred into the hydrous oxide. The batch became thin and finally separated into an aqueous phase and a heavily flocculated product phase. The product contained 30 grams of titanium dioxide, 40 grams of fatty acids and 50 grams of water and was dispersible in fuel oil.

*Example III*

A mixture of tall oil heads dissolved in No. 2 fuel oil in a 1:7 ratio was added to a magnesium hydrate slurry containing 41 percent magnesium oxide. The oil added amounted to 80 percent of the weight of the magnesium oxide. When this mixture was thoroughly stirred a thick emulsion resulted. Microscopic examination disclosed a continuous oil phase and small water bubbles in the discontinuous phase. The addition of six percent by volume of isopropyl alcohol with gentle mixing resulted in the separation of considerable water. The oil phase analyzed: magnesium oxide, 41.6 percent; tall oil heads, 4.16 percent; fuel oil, 29.2 percent; and water 25.1 percent.

*Example IV*

A mixture of one part tall oil free fatty acid and three parts light fuel oil was slowly added to 600 grams of magnesium hydrate slurry containing 246 grams of magnesium oxide. When 98 grams had been added, with agitation, intense flocculation occurred and considerable water separated. 42.5 grams of light fuel oil was mixed with the flocculated material and a thin cream resulted. When 30 ml. of isopropyl alcohol was added to this cream, 190.4 ml. of water-alcohol mixture separated almost immediately and was removed. The final batch weighed 577 grams and had a composition as follows: magnesium oxide, 42.7 percent; fatty acids, 4.27 percent; fuel oil, 20.10 percent; and water, 33.0 percent.

*Example V*

A 400 gram magnesium hydrate slurry containing 164 grams of magnesium oxide was mixed with 13.75 grams of tall oil free fatty acids and 96.25 grams of light fuel oil using a high speed stirrer. Within three minutes a smooth creamy emulsion resulted. The cream was heated to 60° C. and 20 ml. of isopropyl alcohol added. A rapid separation of an aqueous phase resulted. The oil phase analyzed as follows: magnesium oxide, 44.3 percent; fatty acid, 3.72 percent; fuel oil, 26 percent; and water, 25.95 percent.

*Example VI*

A 10% solution of commercial aluminum sulphate was neutralized with ammonia to precipitate all the alumina and heated to 70° C. to assist in filtration. The aluminum hydrate was separated and washed to remove the bulk of the ammonium sulphate. The washed hydrate possessed a pH of 7.5.

Ninety pounds of this hydrate, containing the equivalent of 3.6 pounds of aluminum oxide, were mixed with twenty pounds of a composition of 50% tall oil free fatty acids and 50% No. 2 fuel oil. Complete flocculation occurred and a heavy butter-like phase was separated by decantation. The product contained 3.6 pounds of $Al_2O_3$, 20 pounds of mixed oils and 13.4 pounds of water. This was easily dispersed in No. 2 fuel oil and, after standing for several hours, 10 pounds of water separated below the oil phase and was removed.

*Example VII*

An oil dispersed calcium oxide-fatty acid complex was made by admixing, with good agitation, a mixture of 1 part of tall oil free fatty acids and 3 parts of No. 2 fuel oil with 50 grams of a slurry of hydrated lime in water. The slurry contained the equivalent of 5 grams of CaO. When 17.7 grams of oil-fatty and (4.425 grams of acid) had been added, a strong flocculation occurred and an oil phase containing the lime separated from the aqueous phase. The product was not a calcium soap but an oil wetted complex which was easily dispersed in 10 grams of No. 2 fuel oil.

*Example VIII*

An oil dispersible mixture of alumina and zirconia complexes was made by dissolving 134 grams of aluminum sulfate and 38 ml. of zirconium sulfate solution (265 g./l. $ZrO_2$) in three liters of water. The ingredients were mixed and neutralized to an 8 pH with ammonia (10% aqueous). A slurry of hydrated aluminum oxide and hydrated zirconium oxide was produced and contained some excess ammonia. To this slurry a mixture of 17.5 grams of tall oil free fatty acids and 52.5 grams of No. 2 fuel oil was added. A white cream resulted. Thereafter the pH was adjusted to 6 with 5% aqueous sulfuric acid. Intense flocculation occurred. The precipitate was filtered and washed to remove the sulfate. The product contained 35 grams mixed oxides (9%), 70 grams oils, and 285 grams water. The product was then admixed with 50 grams of fuel oil resulting in an aqueous phase and an oil phase. The aqueous phase was removed and a thick paste remained having 35 grams mixed oxides (12.3%), 120 grams of oils and 130 grams of water. This product was not oil-soluble, but was oil-dispersible.

*Example IX*

Seven and one-half pounds of aluminum sulfate (containing the equivalent of 1.26 pounds of alumina) was dissolved in three gallons of water. This solution was mixed with a 716 ml. solution of zirconium sulfate (.365 pound zirconia) in the ratio of seven alumina to two zirconia. The mixed solutions were neutralized with ammonia (10% aqueous) to a 9 pH. To this slurry a mixture of 1.6 pounds tall oil and 1.6 pounds No. 2 fuel oil was added. A phase separation occurred and water was poured off leaving a cream-like, opaque material. A thinner consisting of 2½ pounds of No. 2 fuel oil was added and mixed with the product. The product analyzed 10.6% mixed oxides. Thereafter, one percent by volume isopropyl alcohol was added. The paste darkened and 25% by volume separated as water. The product then analyzed 12.3% mixed oxides.

While the present invention has been described in terms of the present preferred embodiments thereof, it is subject to reasonable modifications and may be otherwise embodied within the scope of the appended claims.

I claim:

1. An oil-dispersible complex represented by the formula $ACOO \cdot Y \cdot x(MO)$, where ACOO represents an anion of a tall oil fatty acid, Y represents a basic inorganic cation selected from a group consisting of the alkaline earth metals, the alkali metals, and ammonium, (MO) represents a metal oxide selected from a group consisting of oxides of calcium, magnesium, aluminum, titanium, zirconium, and $x$ is a number greater than 1.

2. An oil-dispersible complex composed essentially of at least one hydrated metal oxide linked by means of a basic inorganic cation to an anion of a tall oil fatty acid, said acid anion comprising 1/100 to 1/4 of the stoichiometric amount of fatty acid required to convert all of said metal oxide to metal soap, said metal oxide being selected from a group consisting of oxides of calcium, magnesium, aluminum, titanium, and zirconium, and said basic inorganic cation being selected from a group consisting of the alkaline earth metals, the alkali metals, and ammonium.

3. An oil-dispersible complex as defined in claim 2 wherein the metal oxide is zirconium oxide.

4. An oil-dispersible complex as defined in claim 2 wherein the metal oxide is titanium oxide.

5. An oil-dispersible complex as defined in claim 2 wherein the metal oxide is magnesium oxide.

6. An oil-dispersible complex as defined in claim 2 wherein the metal oxide is calcium oxide.

7. An oil-dispersible complex as defined in claim 2 wherein the metal oxide is aluminum oxide.

8. An oil-dispersible complex as defined in claim 2 wherein the metal oxide is aluminum oxide and zirconium oxide.

9. The method of forming an oil-dispersible complex which comprises adding a tall oil fatty acid to at least one hydrated metal oxide selected from the group consisting of the oxides of calcium, magnesium, aluminum, titanium, and zirconium on which there is adsorbed basic inorganic cations selected from a group consisting of the alkaline earth metals, the alkali metals, and ammonium, said fatty acid being added in an amount sufficient to neutralize said adsorbed cations, mixing said fatty acid and said hydrated metal oxide until a separation into two phases occurs, one of said phases being an oil phase containing said complex, the other phase being an aqueous phase and separating said oil phase from said aqueous phase.

10. The method as defined in claim 9 wherein the amount of fatty acid contained in said oil-dispersible complex is from about 1 percent to 25 percent of the stoichiometric amount of fatty acid required to convert all of said metal oxide to metal soap.

11. The method as defined in claim 9 wherein said hydrated metal oxide is made by forming an aqueous solution of a metal salt, adding to said solution a sufficient quantity of inorganic hydroxide to neutralize the metal salt solution and form the hydrated metal oxide, said metal oxide having adsorbed thereto cations of the inorganic hydroxide.

12. The method as defined in claim 11 wherein the adsorbed inorganic cation is the ammonium ion.

13. The method as defined in claim 11 wherein the adsorbed inorganic cation is calcium.

14. The method as defined in claim 11 wherein the adsorbed inorganic cation is magnesium.

References Cited by the Examiner

UNITED STATES PATENTS 2,420,233   5/1947   Edwards _____ 260—414 X
2,964,418   12/1960  Kebrich _____ 260—414 X CHARLES B. PARKER, *Primary Examiner.*

TOBIAS E. LEVOW, DANIEL D. HORWITZ,
*Examiners.*

LIONEL M. SHAPIRO, ANTON H. SUTTO,
*Assistant Examiners.*